(12) United States Patent
Hayashi

(10) Patent No.: US 8,605,142 B2
(45) Date of Patent: Dec. 10, 2013

(54) MULTI-EYE IMAGE PICKUP DEVICE

(75) Inventor: Junji Hayashi, Saitama (JP)

(73) Assignee: Fujifilm Corporation, Tokyo (JP)

( * ) Notice: Subject to any disclaimer, the term of this patent is extended or adjusted under 35 U.S.C. 154(b) by 442 days.

(21) Appl. No.: 12/948,230

(22) Filed: Nov. 17, 2010

(65) Prior Publication Data

US 2011/0115893 A1 May 19, 2011

(30) Foreign Application Priority Data

Nov. 18, 2009 (JP) ................................. 2009-262498

(51) Int. Cl.
*H04N 7/18* (2006.01)
(52) U.S. Cl.
USPC .................. 348/77; 348/47; 348/48; 348/54; 348/78; 348/61; 348/79; 348/80; 359/368
(58) Field of Classification Search
USPC ................................................. 348/77, 47–48
See application file for complete search history.

(56) References Cited

U.S. PATENT DOCUMENTS

| | | | | |
|---|---|---|---|---|
| 5,646,679 | A * | 7/1997 | Yano et al. | 348/47 |
| 5,798,791 | A * | 8/1998 | Katayama et al. | 348/218.1 |
| 5,864,360 | A * | 1/1999 | Okauchi et al. | 348/47 |
| 6,118,475 | A * | 9/2000 | Iijima et al. | 348/42 |
| 7,586,534 | B2 * | 9/2009 | Suto et al. | 348/333.09 |
| 2003/0214712 | A1 * | 11/2003 | Yano et al. | 359/466 |
| 2004/0263968 | A1 * | 12/2004 | Kobayashi et al. | 359/462 |
| 2006/0215021 | A1 * | 9/2006 | Suto et al. | 348/139 |
| 2007/0046809 | A1 * | 3/2007 | Nakamura | 348/362 |
| 2007/0201847 | A1 * | 8/2007 | Lei | 396/51 |
| 2008/0117316 | A1 * | 5/2008 | Orimoto | 348/240.3 |
| 2008/0239135 | A1 * | 10/2008 | Tamura | 348/335 |
| 2008/0284842 | A1 * | 11/2008 | Hu | 348/46 |

FOREIGN PATENT DOCUMENTS

| | | | |
|---|---|---|---|
| EP | 1580684 | B1 * | 12/2008 |
| JP | 2007-104586 | A | 4/2007 |
| JP | 2007104586 | A * | 4/2007 |

* cited by examiner

*Primary Examiner* — Andy Rao
*Assistant Examiner* — Shan Elahi
(74) *Attorney, Agent, or Firm* — Birch, Stewart, Kolasch & Birch, LLP

(57) ABSTRACT

A digital camera has two imaging units. In a single photography mode, upon a half press of the shutter release button, imaging units carry out preliminary photography at magnifications different from each other. A face detecting section detects persons' faces from a preliminary image captured by each imaging unit. A face comparing section compares the faces between the two preliminary images. A face evaluating section calculates a face evaluation value of each face, and determines ranking of the faces in each preliminary image based on the face evaluation values. Moreover, in consideration of the ranking of the faces determined in the telephoto preliminary image out of the two preliminary images, the face evaluating section corrects the face evaluation values and ranking of the faces in the wide-angle preliminary image. In each imaging unit, photographic conditions for actual photography are determined with giving high priority to the higher-ranked image.

14 Claims, 8 Drawing Sheets

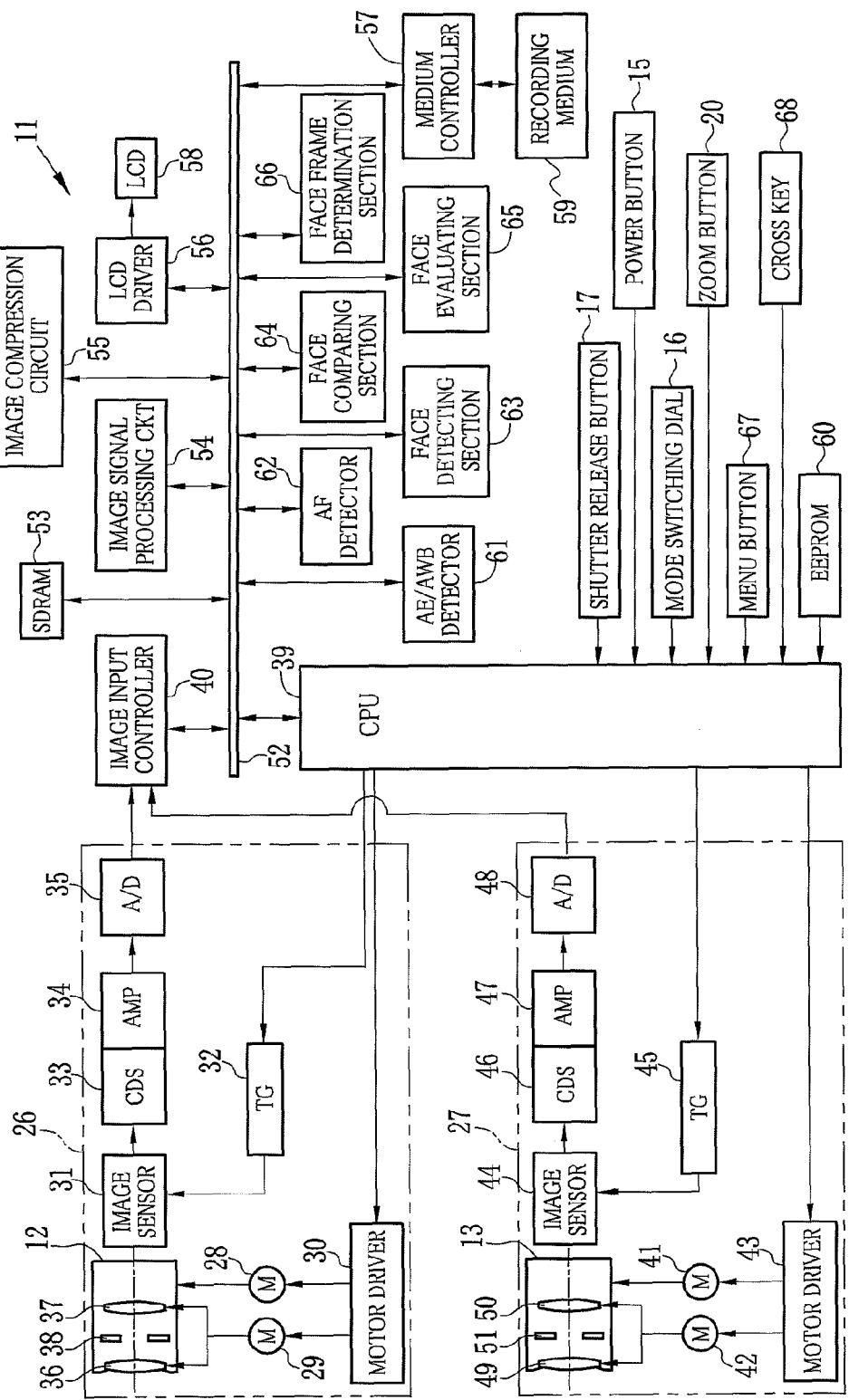

MULTI-EYE IMAGE PICKUP DEVICE

BACKGROUND OF THE INVENTION

1. Field of the Invention

The present invention relates to a multi-eye image pickup device having a plurality of imaging units.

2. Description Related to the Prior Art

A multi-eye image pickup device having a plurality of imaging units is known as a type of digital camera. The multi-eye image pickup device includes a stereoscopic image pickup device for carrying out stereoscopic photography with use of binocular disparity, a panoramic image pickup device that connects plural images captured by the plural imaging units and generates a panoramic image, and the like. Also, there is a type of multi-eye image pickup device that simultaneously takes a plurality of images with photographic conditions different from one another, e.g. different magnifications.

In the multi-eye image pickup device according to Japanese Patent Laid-Open Publication No. 2007-104586, a person's face is detected from a preliminary image captured by each imaging unit. Then, in actual photography, focusing is obtained by AF processing and an exposure condition is established by AE processing, so that the detected face is captured optimally.

In this multi-eye image pickup device, however, if an angle of view largely varies from one imaging unit to another, the number, position, and size of persons' faces detected in each preliminary image differ from one another. The AF processing and AE processing are carried out based on each preliminary image, and a focal point and the exposure condition are established differently from one imaging unit to another. Thus, not all the imaging units appropriately capture the image of the desired person's face in the actual photography.

SUMMARY OF THE INVENTION

An object of the present invention is to provide a multi-eye image pickup device in which every imaging unit can appropriately capture an image of a desired person's face.

To achieve the above and other objects of the present invention, a multi-eye image pickup device according to the present invention includes a plurality of imaging optical systems, a plurality of image sensors, a face detecting section, a face comparing section, and a face evaluating section. Each of the imaging optical systems is set at one magnification discretely. Each of the image sensors captures an image formed by each of the imaging optical systems. The face detecting section detects a person's face from each of the images captured in preliminary photography. The face comparing section compares the faces among the images captured by the plural image sensors, to find out a correspondence among the faces of the same person. The face evaluating section calculates a face evaluation value based on a feature amount for characterizing the face, and ranks the faces based on the face evaluation values if the plural persons' faces are detected in each of the images. The face evaluating section reflects ranking of the faces determined in a most telephoto image out of the plural images in ranking of the faces in the other image captured at a different magnification lower than a magnification of the most telephoto image.

The multi-eye image pickup device may further include an image capture controller. The image capture controller captures the image under a photographic condition that is obtained by data of the faces weighted in accordance with the ranking.

It is preferable that the face that is ranked in the first place in the most telephoto image be ranked by the face evaluating section in the first place in the other image captured at the difference magnification.

It is preferable that out of the faces detected from the other image captured at the different magnification, the face corresponding to the face detected from the most telephoto image be weighted so as to have the high face evaluation value.

The image capture controller may control an auto focusing function, an auto exposure function, and an auto white balance function on an imaging optical system basis.

The multi-eye image pickup device may further include an image correction section. The image correction section applies image correction processing to each of the images.

The multi-eye image pickup device may further include a memory for storing a comparison face image in advance. The face comparing section may compare the faces detected from the images with use of the comparison face image stored in the memory.

The multi-eye image pickup device may further include a monitor for selectively displaying at least one of plural live images. Each of the live images is produced from each of the captured images.

The multi-eye image pickup device may further include an indicator for indicating existence of the person's face outside an image capture field of the most telephoto image, if the number of the faces detected from a most telephoto live image produced from the most telephoto image is less than the number of the faces detected from the live image produced from the other image captured at the difference magnification.

The indicator may briefly switch display of the monitor from the most telephoto live image to the live image having more faces than the most telephoto live image. Otherwise, the indicator displays a mark in the most telephoto live image displayed on the monitor. The mark indicates a direction of the person's face existing outside the most telephoto image. Otherwise, the indicator displays on the monitor both of the most telephoto live image and the live image having more faces than the most telephoto live image in a tiled manner.

The multi-eye image pickup device may further include a face frame determination section for determining the position and size of a face frame enclosing the face in the live image displayed on the monitor based on the face detected by the face detecting section. At least one of line thickness, shape, and color of the face frame depends on whether or not the face enclosed by the face frame corresponds to the face detectable from the most telephoto live image produced from the most telephoto image.

While the live image produced from the other image captured at the different magnification is displayed on the monitor, the face evaluating section may not reflect the ranking of the faces determined in the most telephoto image in the ranking of the faces in the other image captured at the different magnification. The image capture controller may separately capture the image with each of the imaging optical systems, and the image correction section may separately apply the image correction processing to each of the images.

According to the present invention, the ranking of the faces determined in the most telephoto image is reflected in the ranking of the faces in the other image captured at the different magnification. This allows the correct ranking of the faces in the image captured in a wide-angle state. Furthermore, data of the faces is weighted in accordance with the ranking, and AE and AF processing is carried out based on the weighted data. Thus, the higher the face ranked, the more shapely the face is captured.

BRIEF DESCRIPTION OF THE DRAWINGS

For more complete understanding of the present invention, and the advantage thereof, reference is now made to the following descriptions taken in conjunction with the accompanying drawings, in which:

FIG. 2 is a block diagram of the digital camera;

DESCRIPTION OF THE PREFERRED EMBODIMENTS

Figure 1:
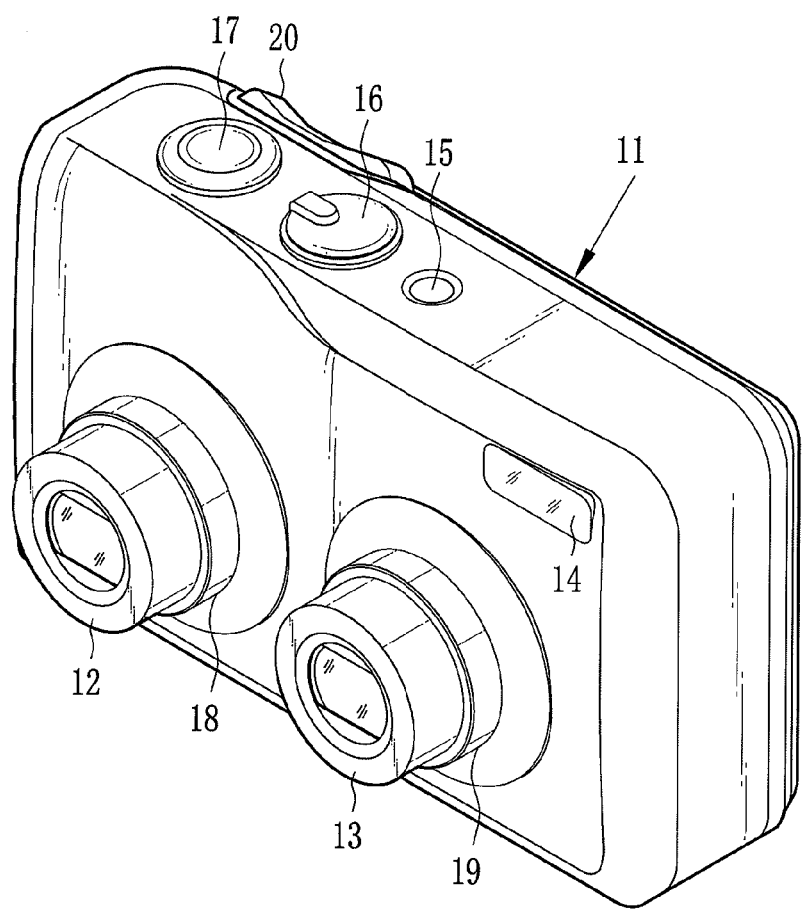
FIG. 1 is a perspective view of a digital camera.

Referring to FIG. 1, a digital camera 11 having two imaging units 26 and 27 (see FIG. 2) is a multi-eye image pickup device that simultaneously takes two images. On a front surface of the digital camera 11, there are provided two lens barrels 12 and 13 each of which contains an imaging optical system, a flash light emitting unit 14, and the like. On a top surface of the digital camera 11, there are provided a power button 15 for turning the digital camera 11 on or off, a mode switching dial 16 for switching a photography mode, a shutter release button 17 used for shutter release operation, and the like.

The lens barrels 12 and 13 are retractable. While the digital camera 11 is turned off, the lens barrels 12 and 13 are contained in container space 18 and 19 provided in the front surface of the digital camera 11, respectively. Upon turning the digital camera 11 on, on the other hand, the lens barrels 12 and 13 protrude from the front surface of the digital camera 11, and stop at a wide-angle end. Operation of a zoom button 20 provided on a rear surface of the digital camera 11 allows protrusion or retraction of the lens barrel 12, 13 to change a magnification.

By turning the mode switching dial 16, the arbitrary mode is selected from the plural photography modes with different photographic conditions. There are three photography modes, that is, a single photography mode in which only one of the imaging units 26 and 27 carries out photography, a multiple photography mode in which both of the two imaging units 26 and 27 carry out photography with the magnifications different from each other, and a 3D photography mode in which an R viewpoint image and an L viewpoint image are captured with the equal magnification. In the multiple photography mode and the 3D photography mode, preliminary photography is carried out upon a half press of the shutter release button 17 to establish the photographic conditions. Then, in response to a full press of the shutter release button 17, the two imaging units 26 and 27 simultaneously carry out actual photography. The case of selecting the multiple photography mode will be described below.

As shown in FIG. 2, the first imaging unit 26 is constituted of the lens barrel 12, a zoom motor 28, a focus motor 29, a motor driver 30, an image sensor 31, a timing generator (TG) 32, a correlated double sampling circuit (CDS) 33, an amplifier (AMP) 34 for adjustment of a gain in accordance with sensitivity, and an analog-to-digital converter (A/D) 35.

The lens barrel 12 contains a zoom lens 36, a focus lens 37, and an aperture stop 38, which compose the imaging optical system. The zoom motor 28 protrudes the lens barrel 12 to a position corresponding to the magnification, and retracts the lens barrel 12 into the container space 18. The focus motor 29 shifts the focus lens 37 along an optical axis direction. The zoom and focus motors 28 and 29 are connected to the motor driver 30. The motor driver 30 is connected to a CPU 39 having control over the digital camera 11, and drives each motor 28, 29 in response to a control signal from the CPU 39.

The image sensor 31 is disposed behind the imaging optical system. The imaging optical system forms a subject image on a light receiving surface of the image sensor 31. The image sensor 31 is connected to the TG 32. The TG 32 is connected to the CPU 39, and inputs a timing signal (clock pulses) to the image sensor 31 under control of the CPU 39. The image sensor 31 captures the subject image formed on the light receiving surface in synchronization with the timing signal, and outputs an image signal produced from the subject image.

The image signal outputted from the image sensor 31 is inputted to the CDS 33. The CDS 33 converts the inputted image signal into image data of R, G, and B that precisely corresponds to the amounts of electric charges accumulated in individual cells of the image sensor 31. The image data outputted from the CDS 33 is amplified by the AMP 34 in accordance with the sensitivity, and is digitized by the A/D 35. The digital image data from the A/D 35 is inputted to an image input controller 40 as a first image.

As with the first imaging unit 26, the second imaging unit 27 is constituted of the lens barrel 13, a zoom motor 41, a focus motor 42, a motor driver 43, an image sensor 44, a TG 45, a CDS 46, an AMP 47, and an A/D 48. These components of the second imaging unit 27 are identical to those of the first imaging unit 26, and detailed description thereof will be omitted. The lens barrel 13 contains a zoom lens 49, a focus lens 50, and an aperture stop 51, which compose the other imaging optical system. An image signal captured by the image sensor 44 is converted into image data by the CDS 46. The image data is amplified by the AMP 47, and is digitized by the A/D 48. Then, the digital image data from the A/D 48 is inputted to the image input controller 40 as a second image.

The image input controller 40 is connected to the CPU 39 through a data bus 52. Similarly, an SDRAM 53, an image signal processing circuit 54, an image compression circuit 55, an LCD driver 56, and a medium controller 57 are connected to the CPU 39 through the data bus 52.

The image input controller 40 writes the first and second images inputted from the imaging units 26 and 27 to the SDRAM 53 on a screen basis under control of the CPU 39.

The image signal processing circuit 54 reads out the first and second images from the SDRAM 53, and applies to each image various types of image correction processing including gradation correction, white balance correction, and gamma correction based on subject brightness detected from an AE detection area. Then, the processed images are rewritten to the SDRAM 53.

The image compression circuit 55 reads out from the SDRAM 53 the first and second images processed by the image signal processing circuit 54. Then, the image compression circuit 55 compresses each image in a predetermined compression format such as TIFF or JPEG, and re-writes the compressed first and second images to the SDRAM 53.

The LCD driver 56 reads out the first and/or second images from the SDRAM 53 in response to a command from the CPU 39. The LCD driver 56 displays the read first and/or second images as a through image or a live image on a liquid crystal display (LCD) 58 disposed on a rear surface of the digital camera 58.

In response to a command from the CPU 39, the medium controller 57 gets access to a recording medium 59 e.g. a memory card detachably loaded into a medium slot, and reads or writes the first and second images from or to the recording medium 59. In response to an actual photography execution command issued upon the full press of the shutter release button 17, the CPU 39 writes to the recording medium 59 the first image of a single screen and the second image of a single screen that are compressed by the image compression circuit 55.

To the CPU 39, an EEPROM 60 is connected. The EEPROM 60 stores various types of programs and data to control the digital camera 11. The CPU 39 reads out the programs and data from the EEPROM 60, and executes various types of processing.

To the CPU 39, an AE/AWB detector 61, an AF detector 62, a face detecting section 63, a face comparing section 64, a face evaluating section 65, and a face frame determination section 66 are connected via the data bus 52 in addition to above.

The face detecting section 63 detects a person's face from a preliminary image captured in the preliminary photography. To detect the person's face, a method of using a histogram of hue and chroma produced from a photometric value as disclosed in U.S. Pat. No. 5,309,228, a method of using skin color detection as disclosed in Japanese Patent Laid-Open Publication No. 07-306483, or the like is available. Otherwise, a technique using pattern matching is also available.

The person's face detected by the face detecting section 63 is assigned as the AE detection area and an AF detection area. If no face is detected, for example, an initial detection area of a proper size that is predetermined in the middle of the image is assigned as the AE and AF detection areas.

The AE/AWB detector 61 detects the subject brightness of the AE detection area, and outputs the subject brightness to the CPU 39. The CPU 39 judges propriety of an exposure amount and white balance based on the subject brightness, and determines charge storage time (shutter speed) of each image sensor 31, 44 and an aperture value of each aperture stop 38, 51. The AE/AWB detector 61 and the CPU 39, as described above, control an auto-exposure function and an auto white balance function.

The AF detector 62 extracts a high frequency component from the AF detection area, and outputs to the CPU 39 an AF evaluation value that is a multiplication of the high frequency component. The CPU 39 commands the motor driver 30, 43 to actuate the focus motor 29, 42 in order to shift the focus lens 37, 50 to an in-focus position at which the AF evaluation value becomes maximum, in other words, the AF detection area has the highest contrast. Thus, the person's face in the AF detection area is brought into focus. The AF detector 62 and the CPU 39, as described above, carry out an auto-focusing function.

The face comparing section 64 compares the person's face detected from the preliminary image captured by the first imaging unit 26 with the person's face detected from the preliminary image captured by the second imaging unit 27, and judges whether or not the faces belong to the same person. In the comparison, a face image stored in advance on the EEPROM 60 is used. The face comparing section 64 judges whether or not each detected image matches with the face image stored on the EEPROM 60.

The face evaluating section 65 calculates a face evaluation value of the face detected from each preliminary image. If the plural persons' faces are detected from the single preliminary image, the face evaluating section 65 ranks the faces based on the face evaluation values.

The ranking of the faces based on the face evaluation values is used for assigning a weight in the AE and AF processing. In the AE processing, for example, data of each face is multiplied by a weighting coefficient corresponding to the ranking. The weighted data is added to obtain the subject brightness. Then, an exposure condition is established in accordance with the subject brightness. Ranking the persons' faces, as described above, makes it possible to carry out photography preparation processing and image correction processing with respect to the face ranked in the first place and also in consideration of the other faces. Consequently, all faces are captured in a state of correctable.

To calculate the face evaluation value, there are available a method of U.S. Pat. No. 7,693,413 in which the face evaluation value is calculated based on the posture (angle) of the face, the size of the face, and the position of the face in the image, a method of Japanese Patent Laid-Open Publication No. 05-020442 in which the face evaluation value is calculated from gradation distribution of the image, a method of Japanese Patent Laid-Open Publication No. 08-221547 in which the face evaluation value is calculated based on type classification by mosaic, a method of Japanese Patent Laid-Open Publication No. 2003-178304 in which the face evaluation value is calculated based on a histogram of a facial part (for example, eyes) extracted from the face, and the like.

If the plural persons' faces are detected in each preliminary image, the ranking of the faces determined in the preliminary image taken in a more telephoto state gets a high priority, in order to avoid a mismatch in the ranking between the preliminary image captured by the first imaging unit 26 and the preliminary image captured by the second imaging unit 27. Taking the case of FIG. 3A as an example, the faces of persons A and B are detected from the preliminary image (telephoto preliminary image) taken in a relatively telephoto state, and the face of the person A is ranked in the second place and the face of the person B is ranked in the first place. This ranking is reflected in the ranking of the preliminary image (wide-angle preliminary image) taken in a wide-angle state, as shown in FIG. 3B. In other words, in the wide-angle preliminary image, the face of the person A is ranked in the second place, and the face of the person B is ranked in the first place.

To avoid a mismatch in the first-ranked faces between the telephoto preliminary image and the wide-angle preliminary image, the face evaluating section 65 ranks the face that is ranked in the first place in the telephoto preliminary image also in the first place in the wide-angle preliminary image. To be more specific, in the wide-angle preliminary image, the temporarily calculated face evaluation value of the corresponding face is multiplied by a weighting coefficient $\alpha$ exceeding 1. Taking the case of FIGS. 3A and 4 as an example, if the face of the person B is ranked in the first place in the telephoto preliminary image as shown in FIG. 3A, the face evaluation value of the person B becomes $\alpha Wb$ in the wide-angle preliminary image as shown in FIG. 4, by multiplying the temporary face evaluation value Wb by the weighting coefficient $\alpha$.

Moreover, out of the faces detected from the wide-angle preliminary image, the face evaluating section 65 assigns weight only to the faces of the same persons as those detected from the telephoto preliminary image, to make the face evaluation values of the same persons higher than those of the others. To assign weight, there is an available method in which the temporarily calculated face evaluation value is multiplied by the weighting coefficient exceeding 1. However, for the purpose of distinguishing the first-ranked face in the telephoto preliminary image from the lower-ranked face, the weighting coefficient α of the first-ranked face is set larger than a weighting coefficient β of the lower-ranked face.

Figure 3A:
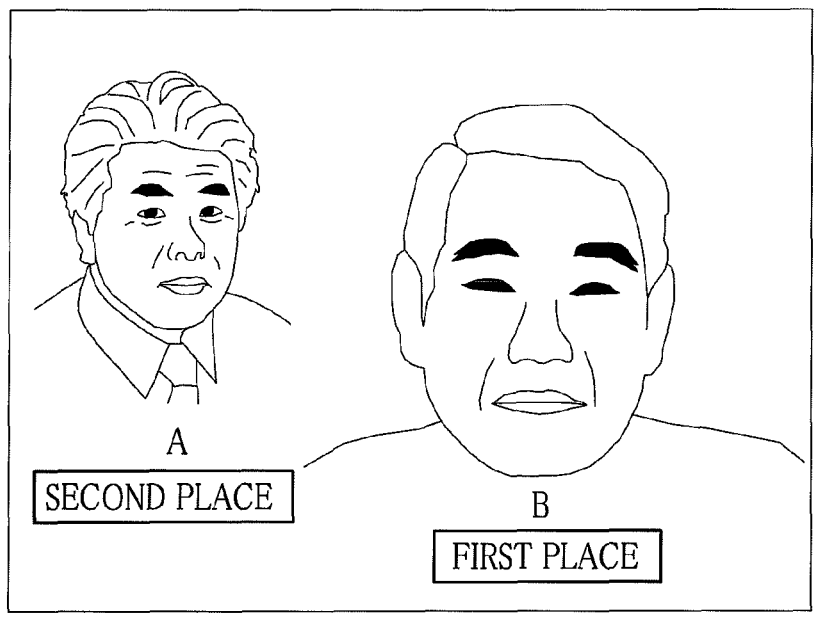
FIG. 3A is an explanatory view of ranking of persons' faces in a telephoto preliminary image based on face evaluation values.
Figure 3B:
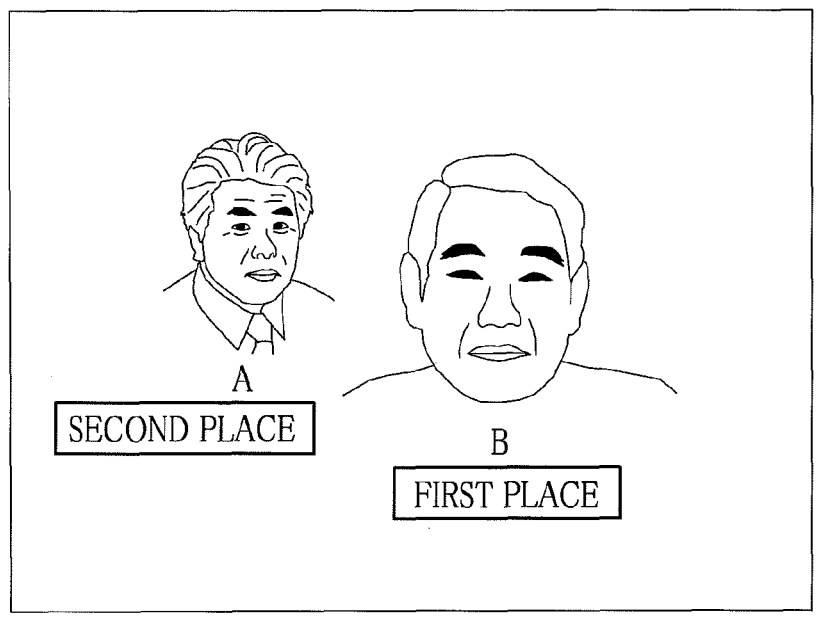
FIG. 3B is an explanatory view of ranking of the faces in a wide-angle preliminary image.
Figure 4:
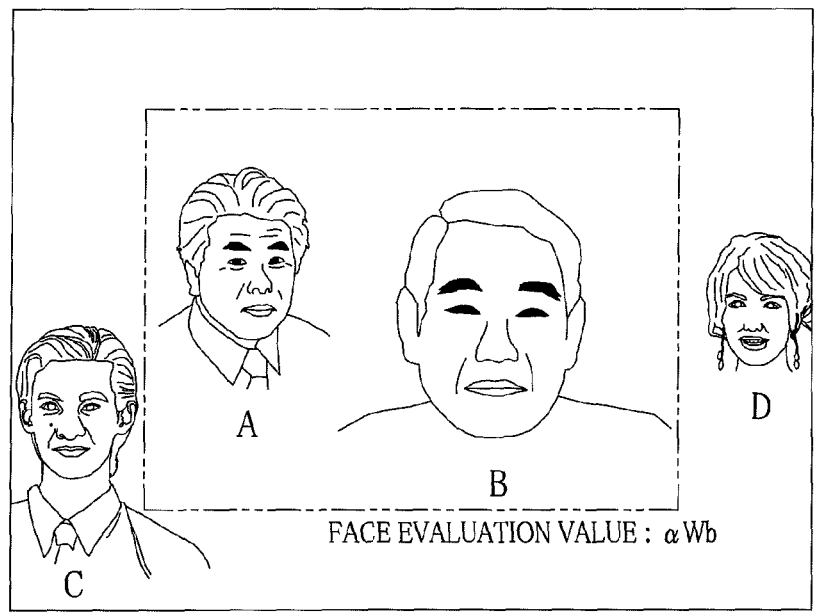
FIG. 4 is an explanatory view of an example of the face evaluation value in another wide-angle preliminary image.
Figure 5:
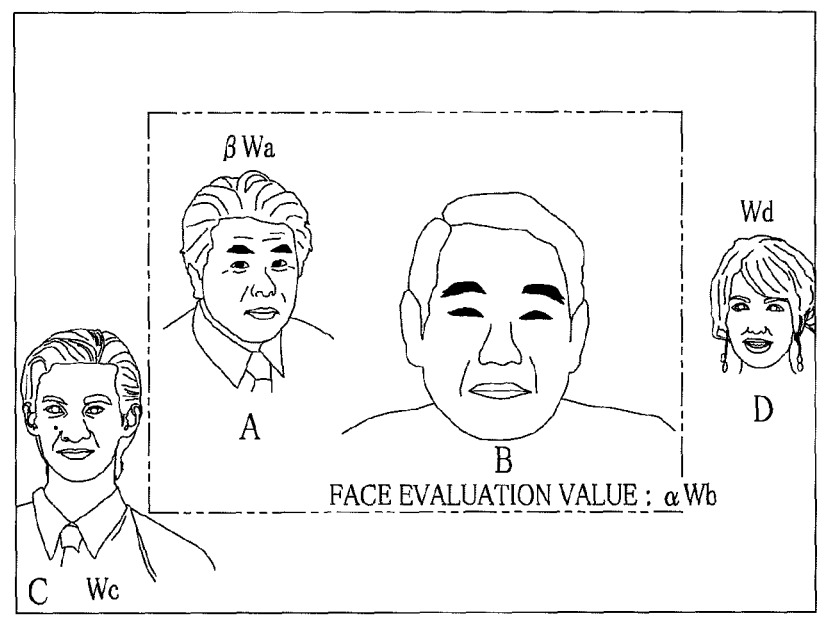
FIG. 5 is an explanatory view of another example of the face evaluation values in the wide-angle preliminary image.

Taking a case where, as shown in FIG. 3A, the faces of the persons A and B are detected from the telephoto preliminary image as an example, if the faces of the persons A to D are detected from the wide-angle preliminary image, as shown in FIG. 5, the face evaluation value of the person B, who is ranked in the first place in the telephoto preliminary image, becomes αWb by multiplying the temporary face evaluation value Wb by the weighting coefficient α. The face evaluation value of the person A, who is ranked in the second place in the telephoto preliminary image, becomes βWa by multiplying the temporary face evaluation value Wa by the weighting coefficient β. Since the faces of the persons C and D are not detected in the telephoto preliminary image, the face evaluation values of the persons C and D coincide with the temporary face evaluation values Wc and Wd, respectively.

Figure 6:
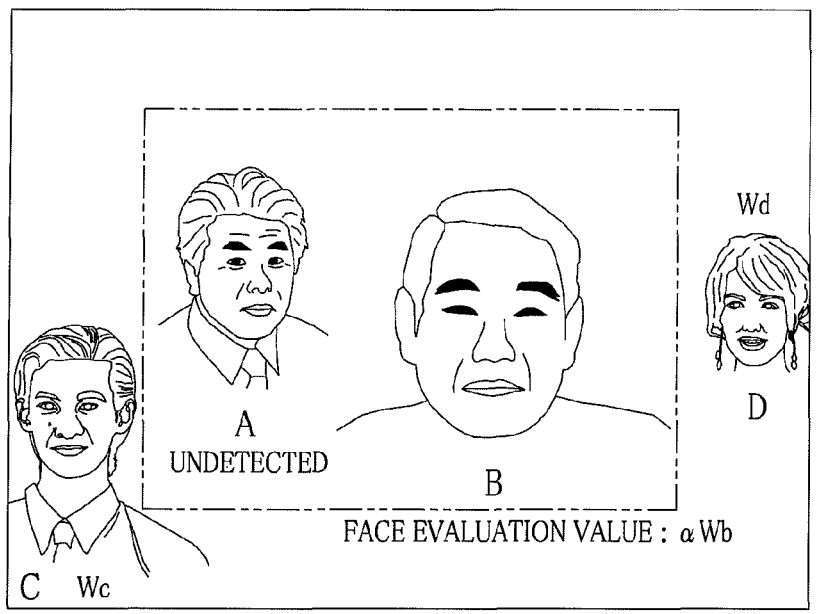
FIG. 6 is an explanatory view of further another example of the face evaluation values in the wide-angle preliminary image.

In a case where although the face of a certain person is detected from the telephoto preliminary image, the face of the same person cannot be detected from the wide-angle preliminary image, the face evaluating section 65 cannot calculate the face evaluation value of this person. Taking a case where, as shown in FIG. 3A, the faces of the persons A and B are detected from the telephoto preliminary image as an example, if the face of the person A cannot be detected from the wide-angle preliminary image due to some defect, though only the faces of the persons B, C, and D are detected, as shown in FIG. 6, the face evaluation value of the person B is not calculated, though the face evaluation values of the persons A, C, and D are calculated.

The face frame determination section 66 determines the position and size of a face frame 71 (see FIGS. 7A and 7B) that encloses the face in the through image displayed on the LCD 58, based on the position and size of the face detected by the face detecting section 63.

To the CPU 39, there are connected various operation parts including a menu button 67 and a cross key 68 provided on a rear surface of the digital camera 11, in addition to the power button 15, the mode switching dial 16, the shutter release button 17, and the zoom button 20. These operation parts detect operation by a user, and inputs a detection result to the CPU 39.

Upon a press of the power button 15, electric power is supplied from a battery (not illustrated) to each part to actuate the digital camera 11. Then, upon another press of the power button 15, the electric power supply is stopped to turn the digital camera 11 off. In response to detection of the operation of the power button 15, the CPU 39 drives the zoom motors 28 and 41 in accordance with the operation so as to extend or retract the lens barrels 12 and 13. In response to detection of the operation of the mode switching dial 16, the CPU 39 switches the photography mode.

The shutter release button 17 is pressed in two steps. Upon a shallow press (half press) of the shutter release button 17, the preliminary photography is carried out, and various types of photography preparation processing including the AE processing and AF processing are carried out in each imaging unit 26, 27. Following the half press, if the shutter release button 17 is deeply pressed (fully pressed), the actual photography is carried out, and the images captured by the imaging units 26 and 27 are stored on the recording medium 59.

In response to detection of the operation of the zoom button 20, the CPU 39 drives the zoom motor 28, 41 to extend or retract the lens barrel 12, 13, and shifts the zoom lens 36, 49 in the optical axis direction. The CPU 39 disposes each zoom lens 36, 49 in a desired one of zoom positions, which are established at predetermined intervals between a wide-angle end and a telephoto end, to vary the magnification of each imaging unit 26, 27.

Figure 7A:
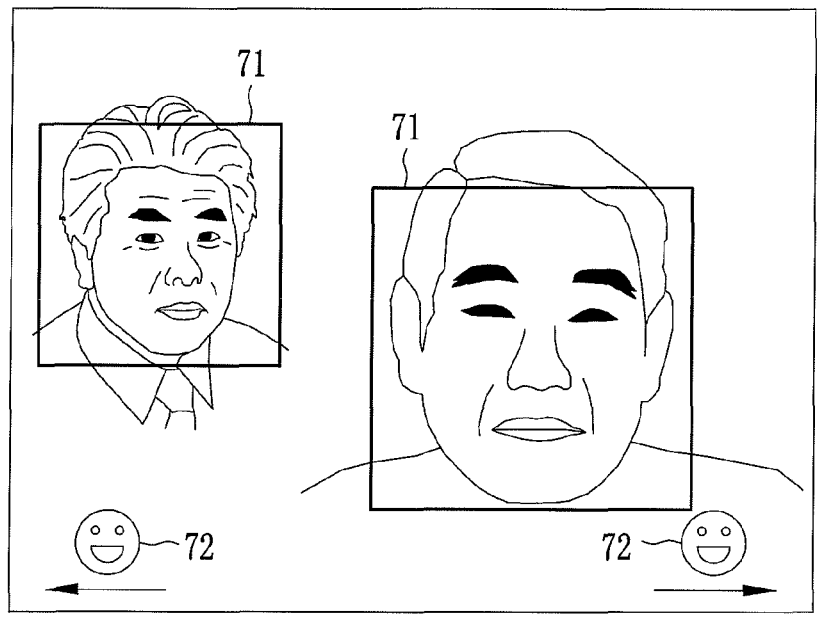
FIG. 7A is a plan view of a liquid crystal display on which a telephoto through image is displayed.

As shown in FIG. 7A, a telephoto through image, which is produced from the telephoto preliminary image, is displayed on the LCD 58. The face frames 71 enclosing the faces appear in the telephoto through image upon the half press of the shutter release button 17, and the face frames 71 disappear upon releasing the half press of the shutter release button 17. If there is a face that is undetectable from the telephoto preliminary image but is detectable from the wide-angle preliminary image, a mark 72 is displayed outside the telephoto through image in order to indicate the detection of the person's face outside the telephoto through image. The mark 72 includes an illustration imitating the person's face, and an arrow indicating the direction of the detected face. The number of the marks 72 corresponds to the number of the faces detected outside the telephoto through image. The marks 72 can be hidden by operation of the menu button 67 and the cross key 68.

Figure 7B:
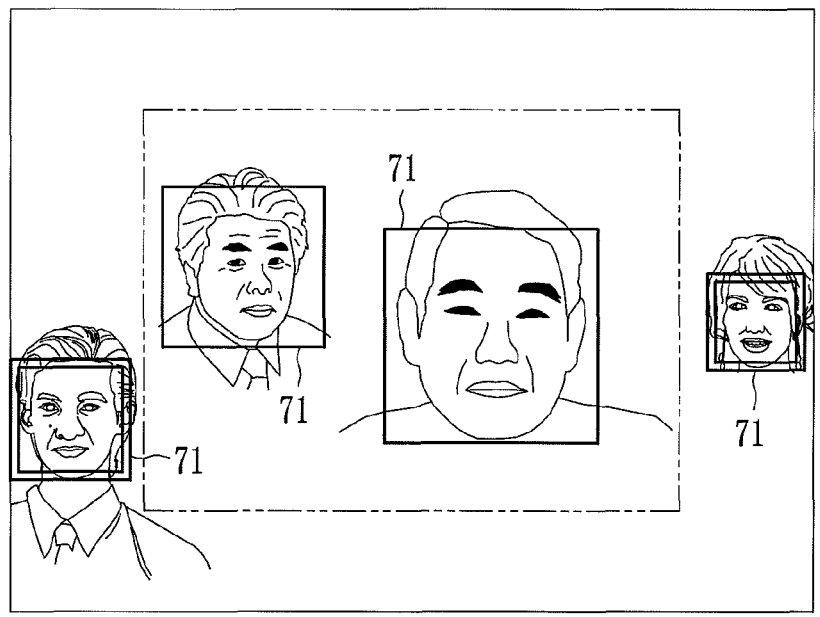
FIG. 7B is a plan view of the liquid crystal display on which a wide-angle through image is displayed.

Upon detection of the predetermined operation of the menu button 67 and the cross key 68, the CPU 39 drives the LCD driver 56 in accordance with the operation, and switches display of the LCD 58 from the telephoto through image to a wide-angle through image, which is produced from the wide-angle preliminary image, as shown in FIG. 7B. If the shutter release button 17 is half pressed, the face frames 71 enclosing the faces appear in the wide-angle through image. The faces of the persons A and B who are detected from both of the telephoto and wide-angle preliminary images are enclosed with the single-line face frames 71, and the faces of the persons C and D who are detected only from the wide-angle preliminary image are enclosed with the double-line face frames 71. The face frame may take any form as long as it can visually distinguish the face detected from both of the telephoto and wide-angle preliminary images from the face detected only from the wide-angle preliminary image. For example, the face frame may differ in its line thickness, shape, color or the like.

After a lapse of predetermine time (for example, three seconds) since switching to the wide-angle through image, the CPU 39 drives the LCD driver 56, and switches the display of the LCD 58 to the telephoto through image, as shown in FIG. 7A. As described above, one of the telephoto through image and the wide-angle through image is selectively displayed on the LCD 58. Also, if the CPU 39 detects the predetermined operation of the menu button 67 and the cross key 68 before the lapse of predetermined time, the display of the LCD 58 is switched to the telephoto through image.

Figure 8:
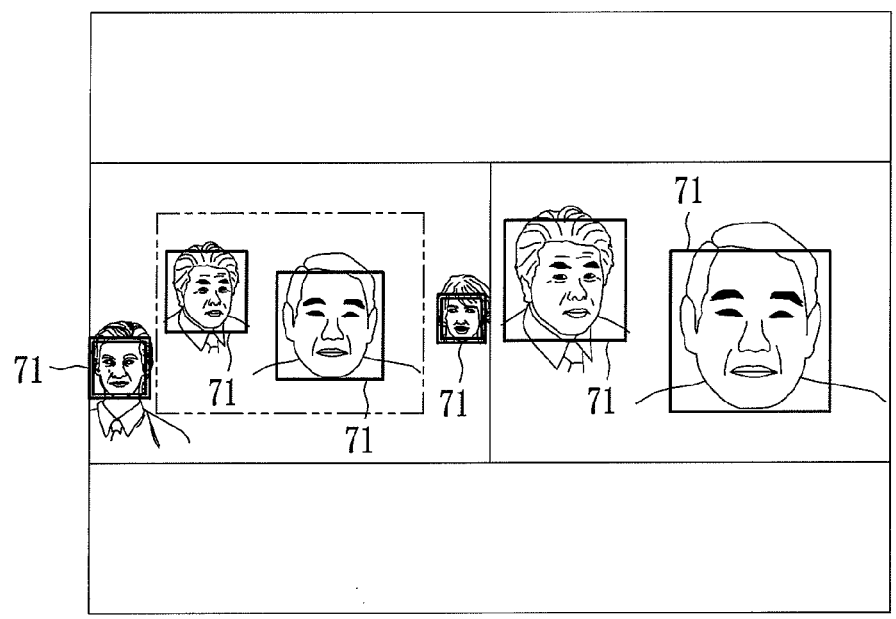
FIG. 8 is a plan view of the liquid crystal display on which the telephoto through image and the wide-angle through image are displayed on a tiled manner.

Upon detection of the other predetermined operation of the menu button 67 and the cross key 68, the CPU 39 drives the LCD driver 56 in accordance with the operation, and the telephoto and wide-angle through images are displayed in a tiled manner on the LCD 58, as shown in FIG. 8. In this state, if the shutter release button 17 is half pressed, the single-line and double-line face frames 71 are displayed on each live image.

As with above, after a lapse of predetermined time (for example, three seconds), the display of the LCD 58 is switched to the telephoto through image, as shown in FIG. 7A. Also, if the CPU 39 detects the predetermined operation of the menu button 67 and the cross key 68 before the lapse of predetermined time, the display of the LCD 58 is switched to the telephoto through image.

Figure 9:
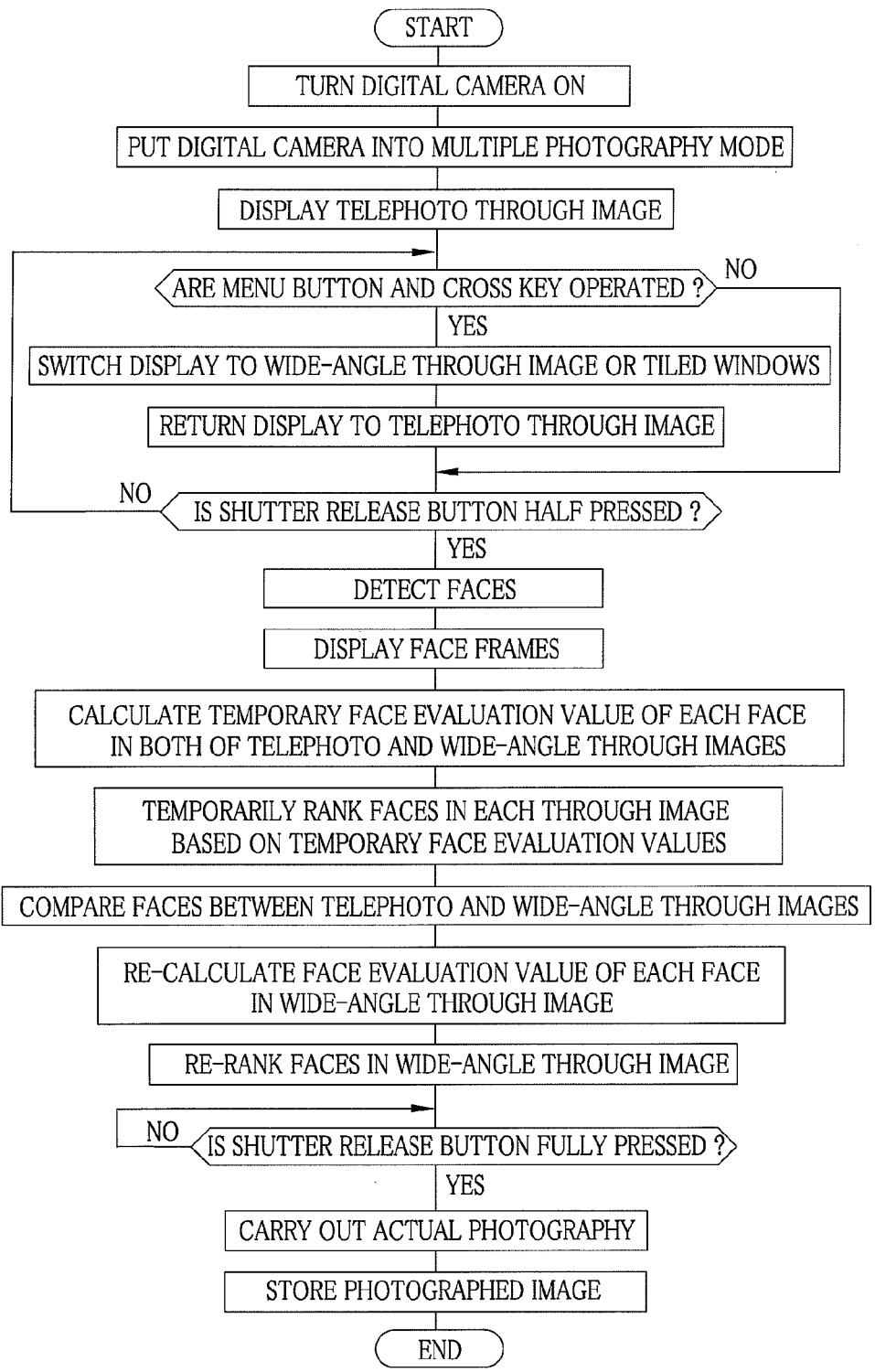
FIG. 9 is a flowchart of operation of the digital camera.

Next, the multiple photography mode will be described with referring to a flowchart of FIG. 9. First, the power button 15 is pressed to actuate the digital camera 11. Then, the mode switching dial 16 is operated to put the digital camera 11 into the multiple photography mode.

In the multiple photography mode, the two magnifications (focal lengths) applied to the imaging units 26 and 27 are determined in advance. The CPU 39 reads the two magnifications from the EEPROM 60, and adjusts the focal lengths of the imaging units 26 and 27. For example, the first imaging unit 26 is set at the higher magnification to capture a telephoto image, and the second imaging unit 27 is set at the lower magnification to capture a wide-angle image. The two magnifications can be arbitrary values, but the simplest is to use the telephoto end and wide-angle end. Instead of using the predetermined two magnifications, a zoom button may be provided for each imaging unit to set each imaging unit at the arbitrary magnification only in the multiple photography mode.

The telephoto through image (see FIG. 7A) is displayed on the LCD 58. Upon the predetermined operation of the menu button 67 and the cross key 68, the display of the LCD 58 is switched to the wide-angle through image (see FIG. 7B) or tiled windows (see FIG. 8) of the telephoto and wide-angle through images. After the lapse of the predetermined time (for example, three seconds), the display of the LCD 58 returns to the telephoto through image.

Upon the half press of the shutter release button 17, the preliminary photography is carried out. The face detecting section 63 detects the persons' faces from each preliminary image. If at least one person's face is detected, the face frame 71 appears in the through image displayed on the LCD 58. The face evaluating section 65 calculates the temporary face evaluation values of the faces, and temporarily ranks the faces based on the temporary face evaluation values on the preliminary image basis.

The face comparing section 64 compares the detected faces between the preliminary image captured by the first imaging unit 26 and the preliminary image captured by the second imaging unit 27, and finds out a pair of the faces of the same person. After the comparison, the face evaluating section 65 determines the face evaluation values and the ranking of the faces in the wide-angle preliminary image, in consideration of the face evaluation values and the ranking of the faces in the telephoto preliminary image taken in the most telephoto state, out of the preliminary images captured by the first and second imaging units 26 and 27.

If the shutter release button 17 is fully pressed subsequently to the half press, the actual photography is carried out. The preliminary image data of each face area is weighted based on the ranking determined in each preliminary image. The shutter speed, aperture value, and in-focus position of each imaging unit 26, 27 are determined based on the weighted preliminary image data. Each imaging unit 26, 27 captures the image of the single screen with the determined photographic conditions, and outputs the actual image data. The actual image data is subjected to predetermined image signal processing and compression processing, and is stored on the recording medium 59.

As described above, since the face evaluation values and ranking determined in the telephoto preliminary image are reflected in the wide-angle preliminary image, it is possible to correctly rank the faces in the wide-angle preliminary image, in which a desired person to be imaged is hard to distinguish. Therefore, the imaging unit can properly carry out the photography preparation processing, and the desired person's face is sharply captured.

In the above embodiment, if the shutter release button 17 is half pressed while the telephoto through image is displayed on the LCD 58, as shown in FIG. 7B, each imaging unit 26, 27 may separately carry out various types of photography preparation processing, and the image signal processing circuit 54 may separately apply the image correction processing to each of the telephoto and wide-angle preliminary images. In this case, the ranking determined in the telephoto preliminary image based on the face evaluation values is not reflected in the wide-angle preliminary image, and neither is the temporary face evaluation value multiplied by the weighting coefficient $\alpha$ or $\beta$ exceeding 1.

In the above embodiment, the multiple photography mode is explained. However, the present invention is applicable to any photography mode in which the two or more imaging units capture the images with magnifications different from one another, and is also applicable to the 3D photography mode.

In the above embodiment, the digital camera 11 has the two imaging units 26 and 27 that simultaneously carry out photography, but the multi-eye camera according to the present invention may have three or more imaging units that simultaneously carry out photography. In this case, processing is carried out separately from the imaging unit for capturing the most telephoto image, the imaging unit for capturing the wide-angle image, and the imaging unit for capturing a middle-angle image.

In the above embodiment, the persons' faces detected from the individual preliminary images are compared with the face image stored in advance in the EEPROM 60, but the persons' faces detected from the individual preliminary images may be directly compared with one another.

In the above embodiment, the mark 72 is displayed on the LCD 58 as an indicator of the existence of the detected face outside the telephoto through image. The indicator may include a speaker (not illustrated) or the like contained in the digital camera 11 to indicate the existence of the detected face by sound, instead of or in addition to the mark 72.

In the above embodiment, the through image displayed on the LCD 58 is briefly switched by the predetermined operation of the menu button 67 and the cross key 68. However, the display of the LCD 58 may be automatically switched from the telephoto through image (FIG. 7A) to the wide-angle through image (FIG. 7B) for a brief time, in a case where some person's face is detected outside the telephoto through image. Otherwise, the display of the LCD 58 may be automatically switched from the telephoto through image (FIG. 7A) to the tiled windows (FIG. 8) of the telephoto and wide-angle through images for a brief time. A set of components that automatically switches the through images, as described above, functions as the indicator or notification device for indicating the existence of the detected face outside the telephoto through image.

Although the present invention has been fully described by the way of the preferred embodiment thereof with reference to the accompanying drawings, various changes and modifications will be apparent to those having skill in this field.

Therefore, unless otherwise these changes and modifications depart from the scope of the present invention, they should be construed as included therein.

What is claimed is:

1. A multi-eye image pickup device comprising:
a plurality of imaging optical systems, each of the imaging optical systems being set at one magnification discretely;
a plurality of image sensors, each of the image sensors capturing an image formed by each of the imaging optical systems;
a face detecting section for detecting a person's face from each of the images captured in preliminary photography;
a face comparing section for comparing the faces among the images captured by the plural image sensors to find out a correspondence among the faces of a same person; and
a face evaluating section for calculating a face evaluation value based on a feature amount for characterizing the face, and for ranking the faces based on the face evaluation values if the plural persons' faces are detected in each of the images, the face evaluating section reflecting ranking of the faces determined in a most telephoto image out of the plural images in ranking of the faces in the other image captured at a different magnification lower than a magnification of the most telephoto image.

2. The multi-eye image pickup device according claim 1, further comprising:
an image capture controller for capturing the image under a photographic condition, the photographic condition being obtained by data of the faces weighted in accordance with the ranking.

3. The multi-eye image pickup device according to claim 2, wherein the face that is ranked in a first place in the most telephoto image is ranked by the face evaluating section in a first place in the other image captured at the difference magnification.

4. The multi-eye image pickup device according to claim 2, wherein out of the faces detected from the other image captured at the different magnification, the face corresponding to the face detected from the most telephoto image is weighted so as to have the high face evaluation value.

5. The multi-eye image pickup device according to claim 2, wherein the image capture controller controls an auto focusing function, an auto exposure function, and an auto white balance function on an imaging optical system basis.

6. The multi-eye image pickup device according to claim 5, further comprising:
an image correction section for applying image correction processing to each of the images.

7. The multi-eye image pickup device according to claim 1, further comprising:
a memory for storing a comparison face image in advance, wherein the face comparing section compares the faces detected from the images with use of the comparison face image stored in the memory.

8. The multi-eye image pickup device according to claim 1, further comprising:
a monitor for selectively displaying at least one of plural live images, each of the live images being produced from each of the captured images.

9. The multi-eye image pickup device according to claim 8, further comprising:
an indicator for indicating existence of the person's face outside an image capture field of the most telephoto image, if a number of the faces detected from a most telephoto live image produced from the most telephoto image is less than a number of the faces detected from the live image produced from the other image captured at the difference magnification.

10. The multi-eye image pickup device according to claim 9, wherein the indicator briefly switches display of the monitor from the most telephoto live image to the live image having more faces than the most telephoto live image.

11. The multi-eye image pickup device according to claim 9, wherein the indicator displays a mark in the most telephoto live image displayed on the monitor, and the mark indicates a direction of the person's face existing outside the most telephoto image.

12. The multi-eye image pickup device according to claim 9, wherein the indicator displays on the monitor both of the most telephoto live image and the live image having more faces than the most telephoto live image in a tiled manner.

13. The multi-eye image pickup device according to claim 8, further comprising:
a face frame determination section for determining a position and a size of a face frame enclosing the face in the live image displayed on the monitor based on the face detected by the face detecting section,
wherein at least one of line thickness, shape, and color of the face frame depends on whether or not the face enclosed by the face frame corresponds to the face detectable from the most telephoto live image produced from the most telephoto image.

14. The multi-eye image pickup device according to claim 6, wherein while the live image produced from the other image captured at the different magnification is displayed on the monitor, the face evaluating section does not reflect the ranking of the faces determined in the most telephoto image in the ranking of the faces in the other image captured at the different magnification, and the image capture controller separately captures the image with each of the imaging optical systems, and the image correction section separately applies the image correction processing to each of the images.

* * * * *